US012750301B2

(12) United States Patent
Jamil et al.

(10) Patent No.: US 12,750,301 B2
(45) Date of Patent: Sep. 29, 2026

(54) METHOD FOR PREVENTING BLACKHOLING OF TRAFFIC DURING PARTIAL FAILURES IN ETHERNET VIRTUAL PRIVATE NETWORK DATA CENTER INTERCONNECT MULTIHOMING NETWORKS

(71) Applicant: Arista Networks, Inc., Santa Clara, CA (US)

(72) Inventors: Omar Ahsan Jamil, Austin, TX (US); Alton Lo, Freemont, CA (US)

(73) Assignee: ARISTA NETWORKS, INC., Santa Clara, CA (US)

(*) Notice: Subject to any disclaimer, the term of this patent is extended or adjusted under 35 U.S.C. 154(b) by 74 days.

(21) Appl. No.: 18/620,715

(22) Filed: Mar. 28, 2024

(65) Prior Publication Data

US 2025/0310237 A1 Oct. 2, 2025

(51) Int. Cl.
*H04L 45/02* (2022.01)
*H04L 45/28* (2022.01)
*H04L 45/44* (2022.01)

(52) U.S. Cl.
CPC .............. *H04L 45/04* (2013.01); *H04L 45/28* (2013.01); *H04L 45/44* (2013.01)

(58) Field of Classification Search
CPC .......... H04L 45/04; H04L 45/28; H04L 45/44
See application file for complete search history.

(56) References Cited

U.S. PATENT DOCUMENTS

2017/0288970 A1* 10/2017 Lin .......................... H04L 45/54
2018/0139127 A1* 5/2018 Srinivasan .............. H04L 12/44
2021/0385155 A1* 12/2021 Suryanarayana ....... H04L 45/64
2024/0396824 A1* 11/2024 Dhillon ................. H04L 45/033
2025/0080452 A1* 3/2025 Sharma ................... H04L 45/04

OTHER PUBLICATIONS

RFC 7432: BGP MPLS-Based Ethernet VPN, Standards Track, Internet Engineering Task Force (IETF), Feb. 2015, 56 pgs.

* cited by examiner

*Primary Examiner* — Joseph G Ustaris
(74) *Attorney, Agent, or Firm* — Sprinkle IP Law Group

(57) ABSTRACT

Systems and methods that allow a multihomed gateway to monitor its membership in individual domains in an Ethernet Virtual Private Network (EVPN) Data Center Interconnect (DCI) Network, and issue withdrawals from multihoming groups associated with those domains based on this membership, are disclosed. According to embodiments, links between a local domain and a gateway, and between the gateway and a remote domain, can be monitored at the gateway. When the link between the gateway and a domain goes down the gateway may withdraw itself from any multihoming group associated with the domain to which the link has been lost.

20 Claims, 3 Drawing Sheets

METHOD FOR PREVENTING BLACKHOLING OF TRAFFIC DURING PARTIAL FAILURES IN ETHERNET VIRTUAL PRIVATE NETWORK DATA CENTER INTERCONNECT MULTIHOMING NETWORKS

BACKGROUND

Efficiently extending connectivity across multiple sites, particularly in the context of data centers or enterprise networks, is highly desirable in networking scenarios. Ethernet Virtual Private Network (EVPN) has emerged as an advanced and flexible solution for achieving scalable and secure communication across distributed network environments.

Additionally, however, modern enterprises increasingly rely on multiple data centers to ensure business continuity, disaster recovery, and optimal service delivery. Traditional approaches to interconnecting these data centers often encounter challenges in terms of scalability, flexibility, and ease of management. Data Center Interconnect (DCI) over Ethernet Virtual Private Network (EVPN) technology serves as an effective way to facilitate the seamless interconnection of multiple data centers, allowing for efficient resource utilization, load balancing, and high availability across geographically dispersed locations.

One of the key considerations in the deployment of DCI over EVPN is the concept of multihoming. Multihoming refers to the ability of a data center to connect to multiple other data centers simultaneously, enhancing both resiliency and bandwidth availability. Internet Engineering Task Force (IETF) RFCs 8365 and 9014 describe DCI using EVPN and multihoming in such EVPN DCI networks. Thus, in certain contexts multihoming may refer to the ability of a data center to provide or allow more than one gateway to one or more other data centers or domains in such an EVPN DCI network.

There are, however, certain types of failures in these network topologies that have not been accounted for. These types of failures may cause the "blackholing" of traffic in such network topologies (e.g., the discarding, disposal of, or failure to forward or route traffic in such a manner that the traffic does not reach its destination).

It is thus desired to provide systems and methods to detect and ameliorate these types of failures in multihomed EVPN DCI networks.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
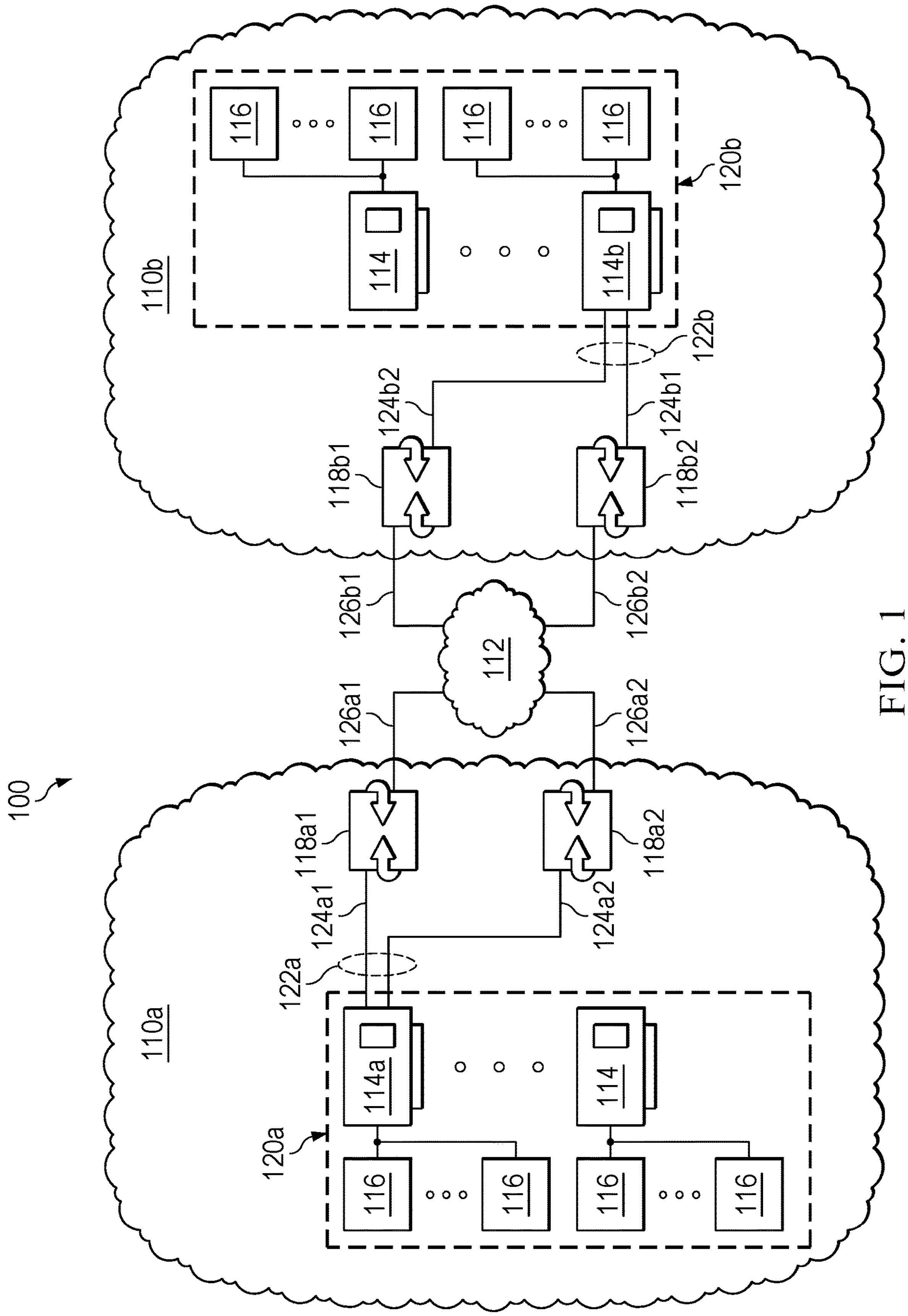
FIG. 1 is a block diagram depicting an architecture of a EVPN DCI multihomed network including an embodiment of a gateway for addressing partial failures of links to domains.

As discussed, traditional networking solutions often face challenges in efficiently extending connectivity across multiple sites, particularly in the context of data centers or enterprise networks. VLAN (Virtual Local Area Network) based solutions have limitations in terms of scalability and ease of management. Additionally, these solutions may not seamlessly support features such as multi-tenancy and dynamic service provisioning. Ethernet Virtual Private Network (EVPN) is a widely utilized solution for achieving scalable and secure communication across distributed network environments. EVPN is a network overlay solution designed to provide scalable and efficient interconnectivity between geographically dispersed sites or data centers over an existing IP (Internet Protocol) infrastructure. EVPN leverages the capabilities of the Border Gateway Protocol (BGP) to enable the distribution of MAC (Media Access Control) and IP routing information across the network, facilitating the creation of overlay networks with improved scalability, flexibility, and ease of deployment.

Modern enterprises increasingly rely on multiple data centers to ensure business continuity, disaster recovery, and optimal service delivery. A data center is usually a specialized facility that provides data serving and backup as well as other network-based services. Traditional approaches to interconnecting these data centers often encounter challenges in terms of scalability, flexibility, and ease of management. Moreover, ensuring secure and efficient communication between data centers while maintaining low-latency connectivity is crucial for the overall performance of distributed applications and services. Data Center Interconnect (DCI) over Ethernet Virtual Private Network (EVPN) technology thus serves as an effective way to facilitate the seamless interconnection of multiple data centers, allowing for efficient resource utilization, load balancing, and high availability across geographically dispersed locations.

One of the key considerations in the deployment of DCI over EVPN is the concept of multihoming. Multihoming refers to the ability of a data center to connect to multiple other data centers simultaneously, enhancing both resiliency and bandwidth availability. In the context of an EVPN DCI network therefore, multihoming may refer to the ability of a data center to provide or allow more than one gateway to one or more other data centers or domains.

EVPN supports multi-homing through mechanisms such as Ethernet Segments (ES) and Ethernet Segment Identifiers (ESI), allowing for the creation of redundant and load-balanced connections between data centers.

Internet Engineering Task Force (IETF) RFCs 8365 and 9014 (incorporated herein by reference in their entirety) describe DCI using EVPN and multihoming in such EVPN DCI networks. In particular, RFC9014 describes an EVPN DCI solution. In this solution, a data center may partition their overlay network into multiple domains, with an EVPN gateway serving as the entrance and exit into the domain. This RFC also describes how the gateway may participate in a multihoming redundancy group, denoting the rules for (e.g., type-4 and type-1) route advertisement.

Thus, in some computer networks, network devices (e.g., routers, switches, etc.) are configured in multihoming topologies, where two or more network devices provide an active redundant connection to the same host (e.g., a virtual machine host). In an EVPN, the various direct connections between a multihomed host and the redundant network devices (e.g., Provider Edge (PE) devices) are referred to as Ethernet Segments (ES) and are assigned Ethernet segment identifiers (ESI). The redundant network devices advertise, to each other and to other network devices with which they maintain an EVPN session, a route (such as an EVPN auto discovery (AD) route) for the ES. An EVPN route (e.g., an EVPN AD per ES route) is advertised by the redundant network devices for each ES to which they are directly connected.

In this configuration, all of the redundant network devices will advertise, to each other and to remote network devices, EVPN AD routes for the ES. In addition, each redundant network device will advertise to remote network devices (e.g., MAC/IP) routes for each host that is available with the ES. In some embodiments, hundreds or thousands of hosts may be available with the ES. Remote network devices use the received (e.g., MAC/IP) routes to determine that the advertised (e.g., MAC/IP) addresses are reachable. The remote network devices are then able to derive (e.g., Layer 3 (L3)) routes based on the received IP routes and can further install the derived routes into their routing tables.

Thus, all network devices in the EVPN control plane that are not local to the ES are configured to send traffic destined for the multihomed host to the ES that is reachable via any of the redundant network devices. This configuration provides great efficiency for network traffic going to and from the multihomed host, particularly if the multihomed host is a very active host, such as a hypervisor running multiple virtual machines.

If a redundant network device's link to the ES is interrupted, said network device will withdraw all advertised (e.g., MAC/IP) routes for all the hosts on the ES affected by the interruption. In particular, as described in IETF RFC 7432 "BGP MPLS-Based Ethernet VPN" (incorporated by reference in its entirety), when a redundant network device's link to an ES is interrupted, said network device withdrawals the corresponding set of EVPN routes for the affected ES. This type of withdrawal (e.g., the withdrawal of the type 1 AD per ES route) as described in RFC 7432 is sometimes referred to as a mass withdrawal.

However, as may be understood from RFC 9014, in EVPN DCI networks there are certain types of failures that have not been previously accounted for (e.g., and are not described in RFC 7432). These failover scenarios, referred to herein as "partial failures," are instances where an EVPN gateway participating in a multihoming group may lose connectivity to one domain (e.g., a local or remote domain) but connectivity to one or more remaining domains remain intact. In the event of these partial failures, it is possible for this gateway to "blackhole" traffic. This problem may exist for unicast traffic as well as Broadcast, Unknown Unicast, and Multicast (BUM) traffic.

To describe in more detail a multihomed gateway in an active state in an EVPN DCI network may have connections to a local domain (e.g., a spine node for a Clos architected domain) as well as one or more remote domains. If such a gateway loses connection only to a remote domain (e.g., a BGP session with the remote domain gateway peers goes down), local domain connectivity (e.g., BGP sessions) between hosts in the local domain and the gateway may remain (e.g., the BGP session may remain active). However, because this local domain connectivity remains, local hosts may still send traffic (e.g., intended for the remote domain) to this gateway (e.g., because an ESI may be used for both the local domain and the remote domain). The gateway, unable to forward this traffic to the remote domain because of lack of connectivity (e.g., BGP session) with the remote domain (e.g., with remote domain peers), may drop this traffic (i.e., the packets comprising this traffic has been blackholed). This situation will persist until connectivity (e.g., a BGP session) between the gateway and the remote domain is re-established.

Similarly, if such a multihomed gateway in a EVPN DCI network loses connection only to the local domain (e.g., a BGP session with the local domain peers such as a spine node), connectivity (e.g., BGP sessions) between the gateway and the remote domain may remain (e.g., BGP sessions between the gateway and remote domain peers may remain active). Because remote domain connectivity (e.g., BGP sessions with the remote domain peers) remains active, remote domain gateways (e.g., using equal cost multipathing or other load balancing, etc.) may still send traffic (e.g., intended for the local domain) to this gateway. The gateway, unable to forward this traffic to the local domain because of lack of connectivity (e.g., BGP sessions) with the local domain (e.g., any spine nodes in the local domain), may drop this traffic (i.e., the packets comprising this traffic has been blackholed). This situation will persist until connectivity (e.g., a BGP session) between the gateway and the local domain is re-established, as the gateway has no ability to bridge inter-domain traffic until connectivity is restored.

Accordingly, when a gateway is participating in a multihoming redundancy group in an EVPN DCI network, and when that gateway loses (e.g., BGP) connectivity to a remote domain or to peers within its local domain, significant traffic loss may result. In other words, the rules of packet transport as described in RFC7432 are not sufficient to handle this type of failure and will result in traffic loss.

It is thus desired to provide mechanisms to detect such partial failures and to improve convergence times to reduce the loss of traffic in these scenarios by withdrawing gateways from multihoming groups associated with a detected partial failure in an EVPN DCI network. In this manner, convergence times on the network can be improved and traffic can quickly be steered to the remaining active gateways.

Accordingly, to address the issue of partial failures, embodiments may include systems and methods adapted to allow a multihomed gateway to monitor its membership in individual domains in a EVPN DCI network by monitoring links between the gateway and the domains to which it is connected. These monitored links may include links to the local domain that includes the gateway (e.g., links between the gateway and spine nodes of the local domain), or links to a remote domain (e.g., links between the gateway and one or more edge devices or remote gateways that provide connectivity to the remote domain). In one embodiment, these links may correspond to BGP sessions such that the monitoring of links comprises tracking BGP session between the gateway and (peers within) the local domain and BGP sessions between the gateway and (peers associated with) one or more remote domains.

In particular the links between the local domain and the gateway, and between the gateway and a remote domain can be monitored at the gateway. The gateway can then detect that the link(s) between the gateway and a domain (e.g., the local domain or a remote domain) have gone down. When the link between the gateway and a domain has gone down (e.g., all links have gone down), the gateway may withdraw itself from any multihoming group associated with the domain to which the link has been lost. This withdrawal may comprise a mass withdrawal associated with an ESI for each multihoming group associated with the lost domain, where the withdrawal is broadcast to peers of the domain to which connectivity remains.

To illustrate in more detail, as part of the configuration for EVPN DCI, each gateway may be configured with (or have access to a configuration for) a set of peers or neighbors (used herein interchangeably) that comprise peers in the local domain and a set of peers or neighbors that comprises peers that allow access to the remote domain. The status of a set of links (e.g., BGP sessions) associated with the set of neighbors in the remote domain and a status for a set of links associated with the set of neighbors in the local domain can thus be maintained. The gateway can update this status based on the state of the corresponding link, and can detect that a link between the gateway and a domain (e.g., the local domain or a remote domain) has gone down. For example, there may be a BGP session between the gateway and each peer of a domain. When a hold timer for that BGP session is missed the gateway may determine that this BGP session has gone down and update the status of that link (e.g., BGP session) to inactive (or some other similar status indicator). As another example, the link status (e.g., link state) for BGP sessions with the set of neighbors in the local domain or associated with the remote domain may be maintained (e.g., by the gateway). If the link status indicates it is down, it can be determined that the corresponding BGP session has gone down.

When a particular link between the gateway and a domain goes down (e.g., a BGP session between the gateway and a peer in that domain has been set to a status of inactive), it can be determined if there are any more active links between the gateway and that domain. In other words, are there any remaining active links (e.g., BGP sessions) between the gateway and any of the set of peers configured for that domain. If there are no more (e.g., active) links between the gateway and the domain (e.g., the local domain or the remote domain), the gateway may detect the link between the domain is down and the gateway can withdraw itself from any multihoming group associated with that domain. Specifically, in certain cases the gateway may withdraw the advertised Evpn Type 1 AD routes and the Evpn Type 4 ES routes associated with that gateway for any multihoming groups associated with that gateway and that domain. The withdrawal of the type-1 and type-4 routes can be described as “shutting down the ESI” or “withdrawing the gateway from the multihoming group”. The gateway may also hold down the route withdrawal for certain (e.g., other) routes or types of routes (e.g., type-2 routes) for a certain (e.g., configurable) time period (e.g., 10 seconds).

Such a withdrawal may include broadcasting this withdrawal to all peers in another domain, wherein the withdrawal is associated with (e.g., specifies) an ESI corresponding to the domain to which connectivity has been lost. For example, if all links to a remote domain are inactive, the gateway may broadcast a message withdrawing from any multihoming group associated with the remote domain to the set of peers of the gateway in the local domain to which the gateway belongs. Conversely, if all links to the gateway's local domain are determined to be inactive the gateway may broadcast a message withdrawing from any multihoming group associated with the remote domain to the set of peers of the gateway in the gateway's local domain. Such a withdrawal may comprise, or initiate, a mass withdrawal as discussed in RFC 7432.

Turning now to FIG. 1, a block diagram depicting a general architecture of a network including an EVPN DCI multihomed network 100 including an embodiment of gateways adapted for monitoring links to domains and addressing partial failures of such links is presented. Here, one or more domains 110*a*, 110*b* are interconnected through network 112 using DCI over EVPN. Each (EVPN) domain 110 may be associated with a data center that includes computing devices that are physically remote from one another, or may be a logical partition of computing resources on physical devices that are co-located. Domain 110 may include devices and networks for providing services or data to devices connected to the domain 110. In particular, each domain 110 may comprise one or more networks 120 implemented by network nodes 114 (e.g., Customer Edge (CE) devices). These nodes 114 may be, for example, spine nodes when networks of domain 110 are a Clos architected domain (e.g., a leaf-spine network). Hosts 116 may connect to nodes 114 (e.g., either directly or indirectly, through a wired connection or a wireless connection, etc.) to access applications, services or data provided through the local domain 110 (e.g., through a data center associated with the local domain 110).

Domains 110 are interconnected by network 112 through provider edge (PE) devices (gateways) 118 at each data center 110. Network 112 may be almost any computing network adapted to transmit data between these PEs such as the Internet, an internet, a Wide Area Network, a wireless or wired network, some combination of networks, etc. Accordingly, PEs 118 may provide an EVPN DCI network between domains 110 such that data can be transported between domains 110 (over network 112) as if domains 110 were directly connected. For example, node 114*a* may be configured as local domain EVPN neighbors at PEs 118*a*1, 118*a*2 and PEs 118*b*1, 118*b*2 may be configured as remote domain EVPN neighbors at PEs 118*a*1, 118*a*2. Conversely, node 114*b* may be configured as local domain EVPN neighbors at PEs 118*b*1, 118*b*2 and PEs 118*a*1, 118*a*2 may be configured as remote domain EVPN neighbors at PEs 118*b*1, 118*b*2.

Each (e.g., local) domain 110*a*, 110*b* is configured to be multihomed to the other (remote) domain 110*a*, 110*b*. Specifically, PEs 118*a*1, 118*a*2 at domain 110*a* are configured to operate as multihomed PEs 118 of a (e.g., single-active or an active-active) multihomed network 120*a* for domain 110*a* while PEs 118*b*1, 118*b*2 at domain 110*b* are configured to operate as multihomed PEs 118 of a (e.g., single-active or an active-active) multihomed network 120*b* for domain 110*b*. Thus, PEs 118*a*1, 118*a*2 at domain 110*a* may be adapted to provide an ES 122*a* to one or more nodes 114*a* of network 120*a* of local domain 110*a*, where that ES 122*a* comprises link 124*a*1 to PE 118*a*1 (including a BGP session) and link 124*a*2 to PE 118*a*2 (including a BGP session). Each PE 118*a*1, 118*a*2 also comprises a respective link (e.g., including a BGP session) 126*a*1, 126*a*2 to remote domain 110*b* (e.g., through network 112).

Similarly, PEs 118*b*1, 118*b*2 may be adapted to provide an ES 122*b* to a node 114*b* of network 120*b* of its local domain 110*b*, where that ES 122*b* comprises link 124*b*1 to PE 118*b*1 and link 124*b*2 to PE 118*b*2. Each PE 118*b*1, 118*b*2 also comprises a respective link 126*b*1, 126*b*2 to remote domain 110*a* (e.g., through network 112). By this configuration, PEs 118 may be utilized to provide an (e.g., active-active) EVPN DCI multihomed network including domains 110. Each PE 118 of a domain 110 is a gateway between local devices 114, 116 on the network 120 of its local domain 110 such that traffic on the local network 120 from hosts 116 can arrive at PEs 118 of the local domain 110 using links 124 of Ethernet segment 122 and can be forwarded to the other (remote) domain 110 over the network 112 using links 126.

Accordingly, PEs (multihomed gateways) 118 may advertise, to each other and to other network devices with which they maintain an EVPN session, a route (such as an EVPN auto discovery (AD) route) for ES 122. Specifically, an EVPN route (e.g., an EVPN AD per ES route) is advertised by the PEs 118 for each ES 122 to which they are directly connected. In this configuration, PEs 118 will advertise, to each other and to remote network devices, EVPN AD routes for the ES 122. In addition, each PE 118 will advertise to remote network devices (e.g., MAC/IP) routes for each host 116 that is available with the ES 122. Remote network devices use the received (e.g., MAC/IP) routes to determine that the advertised (e.g., MAC/IP) addresses are reachable. The remote network devices are then able to derive (e.g., Layer 3 (L3)) routes based on the received IP routes and can further install the derived routes into their routing tables.

Thus, all network devices that are not local to the ES 122 are configured to send traffic destined for a multihomed host 116 to the ES 122 that is reachable via any of the redundant PEs 118. This configuration provides great efficiency for network traffic going to and from the multihomed host 116, particularly if the multihomed host 116 is a very active host, such as a hypervisor running multiple virtual machines.

If a PE's 118 link 124 in ES 122 is interrupted, the PE 118 will withdraw all advertised (e.g., MAC/IP) routes for all the hosts 116 on the ES 122 affected by the interruption (e.g., using a mass withdrawal). In certain cases, partial failures may occur with respect to a PE 118, whereby that PE 118 participating in a multihoming group (e.g., through ES 122) loses connectivity to one domain (e.g., its local domain or the remote domain) but connectivity to one or more domains remains intact. For example, PE **118*a*1 may lose link 126*a*1 to other (remote) domain 110*b* (the BGP session may go down or otherwise be deemed inactive) while link 124*a*1 to node 114*a* of network 120*a* of local domain 110*a*** may remain intact (e.g., an associated BGP session may remain active).

In the event of such a partial failure, it is possible for PE **118*a*1 to blackhole traffic. Namely, because connectivity of PE 118*a*1 to network 120 of local domain 110*a* remains, local hosts 116 may still send traffic (e.g., intended for the remote domain 110*b*) to this PE 118*a*1 (e.g., because an ESI for ES 122*a* may be associated with both the local domain 110*a* and the remote domain 110*b*). PE 118*a*1, unable to forward this traffic to the remote domain 110*b* because of lack of connectivity (e.g., BGP session) with the remote domain 110*b* (e.g., with remote domain peers), may drop this traffic. This situation will persist until link 126*a*1 (e.g., and the corresponding BGP session) between PE 118*a*1 and remote domain 110*b*** is re-established.

Similarly, if PE **118*a*1 loses connection only to the network 120*a* of the local domain 110*a* (e.g., a BGP session with the local domain peers such as a spine node 114*a*) link 126*a*1 (e.g., BGP session) between the PE 118*a*1 and the remote domain 110*b* may remain. Because link 126*a*1 between PE 118*a*1 and remote domain 110*b* remains (e.g., BGP sessions with the remote domain peers remain active), PEs in 118*b* in remote domain 110*b* (e.g., using equal cost multipathing or other load balancing, etc.) may still send traffic (e.g., intended for the local domain 110*a*) to that PE 118*a*1. PE 118*a*1 is unable to forward this traffic to the network 120*a* of local domain 110*a* because of lack of connectivity (e.g., BGP sessions) with the network 120*a* of local domain 110*a* (e.g., spine node 114*a* of network 120*a* in the local domain 110*a*). PE 118*a*1 may thus drop this traffic. This situation will persist until link 124*a* (e.g., a BGP session) between the PE 118*a*1 and the (node 114*a* of network 120*a* of) local domain 110*a* is re-established, as PE 118*a*1** has no ability to bridge inter-domain traffic until connectivity is restored.

Therefore, according to embodiments, PEs 118 may be adapted to detect such partial failures and to reduce the loss of traffic and improve convergence times in these scenarios by withdrawing themselves from multihoming groups associated with a detected partial failure. In particular, PEs 118 may be adapted to monitor membership in individual domains 110 in a EVPN DCI network 100 by monitoring links 124, 126 between the PE 118 and the domains 110 to which it is connected. These monitored links 124, 126 may include links 124 to the local domain 110 that includes the PE 118 (e.g., links 124 between the PE 118 and spine nodes **114*a* of that PEs local domain 110), or links 126 to a remote domain 110 (e.g., links 126 between that PE 118 and one or more edge devices or remote PE's that provide connectivity to the remote domain 110). In one embodiment, these links 124, 126 may correspond to BGP sessions such that the monitoring of links 124, 126 comprises monitoring BGP session between the PE 118 and (peers such as nodes 114 within) the local domain 110 for that PE 118 and BGP sessions between the PE and (peers associated with) one or more remote domains 110**.

In particular the links 124 between the local domain 110 and PE 118 and the links 126 between the PE 118 and a remote domain 110 can be monitored at the PE 118. The PE 118 can then detect that the link(s) 124, 126 between PE 118 and a domain 110 (e.g., the local domain 110 for that PE 118 or a remote domain 110) have gone down. When the links 124, 126 between the PE 118 and a domain 110 have gone down (e.g., all links have gone down), the PE 118 may withdraw itself from any multihoming group associated with the domain 110 to which the link 124, 126 has been lost. This withdrawal may comprise a mass withdrawal associated with an ESI for each multihoming group associated with the lost domain 110, where the withdrawal is broadcast to peers of the domain 110 to which connectivity remains.

To illustrate a more concrete example, PE **118*a*1 can monitor link 124*a*1 (which may include one or more BGP sessions) between PE 118*a*1 and peers in its local domain 110*a* (e.g., node 114*a*). When it determined that all links 124*a*1 between the PE 118*a*1 and the peers in the local domain 110*a* have gone down, PE 118*a*1 may withdraw itself from any multihoming group associated with local domain 110*a* by, for example, determined an ESI associated with an ES corresponding to remote domain 110*a* and broadcasting a withdrawal from this ESI to peers in the remote domain 110*b* (e.g., route reflectors or other network devices in network 112 associated with remote domain 110*b*, or PEs 118*b*1, 118*b*2 in remote domain 110*b***).

Conversely, PE **118*a*1 can monitor link 126*a*1 (which may include one or more BGP sessions) between PE 118*a*1 and peers in remote domain 110*b* (e.g., route reflectors or other network devices in network 112 associated with remote domain 110*b*, or PEs 118*b*1, 118*b*2 in remote domain 110*b*). When it determined that all links 126*a*1 between the PE 118*a*1 and peers in the remote domain 110*b* have gone down, PE 118*a*1 may withdraw itself from any multihoming group associated with remote domain 110*b* by, for example, determined an ESI associated with an ES corresponding to remote domain 110*b* and broadcasting a withdrawal from this ESI to peers in the local domain 110*a* (e.g., node 114*a* or hosts 116**).

Figure 2:
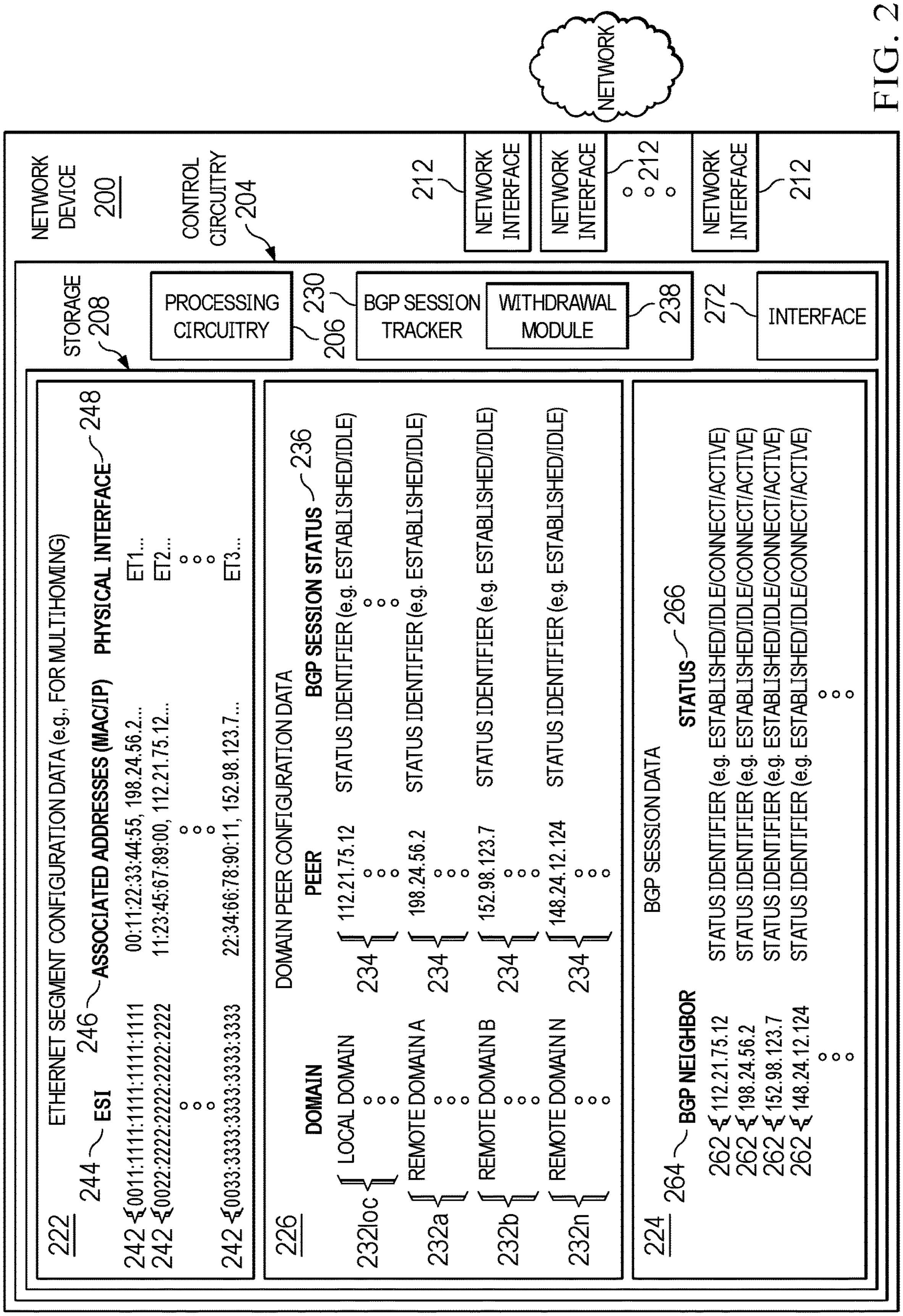
FIG. 2 is a block diagram of one embodiment of a network device for addressing partial failures of links to domains.

FIG. 2 depicts an architecture for one embodiment of a network device adapted for use in an EVPN DCI multihomed network to monitor links to domains and address partial failures of such links to avoid blackholing (e.g., inter domain) traffic. Network device 200 may be a router, switch, server, or any other computing device that may be configured to control or process network traffic. The network device 200 may receive data, including network traffic (e.g., packets or the like), via an input/output (I/O) path. This I/O path may provide traffic data to control circuitry 204, which includes processing circuitry 206 and storage (i.e., memory) 208. Control circuitry 204 may send and receive commands, requests, and other suitable data using the I/O path where the I/O path may connect control circuitry 204 (and specifically processing circuitry 206) to one or more network interfaces 212 to which other devices of a network (e.g., routers or hosts, etc.) can be connected. These network interfaces 212 may be any type of network interface, such as an RJ45 ethernet port, a coaxial port, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units or multiple different processors. The circuitry described herein may execute instructions included in software running on one or more general purpose or specialized processors.

Storage 208 may be an electronic storage device that includes volatile random-access memory (RAM) which does not retain its contents when power is turned off, and non-volatile memory, which does retain its contents when power is turned off. As referred to herein, the phrase "electronic storage device" or "storage device" or "memory" should be understood to mean any device for storing electronic data, computer software, instructions, or firmware, such as RAM, ROM, content-addressable memory (CAM) (including a TCAM), hard drives, optical drives, solid state storage devices, quantum storage devices, or any other suitable fixed or removable storage devices, or any combination of the same.

Network device 200 may be utilized in a EVPN DCI multihomed network. As but one example, a network device may be utilized as a gateway (e.g., PE) in an EVPN DCI multihomed network. When utilized in such a scenario, control circuitry 204 may execute instructions on processing circuitry 206 to adapt network device 200 to monitor links between a local domain and the network device 200 and between the network device 200 and one or more remote domains to detect that the link(s) between the network device 200 and a domain (e.g., the local domain or a remote domain) have gone down. When the link between the network device 200 and a domain have gone down (e.g., all links have gone down) network device 200 may be adapted to issue a withdrawal from any multihoming group associated with the domain to which the link has been lost. This withdrawal may comprise a mass withdrawal associated with an ESI for each multihoming group associated with the lost domain, where the withdrawal is broadcast to peers of the domain to which connectivity remains.

To illustrate in more detail, instructions may be executed on processing circuitry 206 for providing interface 272 (e.g., command line interface (CLI) or the like). Using this interface 272 network device 200 may be configured for use as a gateway in a domain of EVPN DCI multihomed network. As part of this configuration network device 200 may be configured with domain peer configuration data 226. This domain peer configuration data 226 may include each of a set of domains 232 in the EVPN DCI network with which network device 200 may communicate. These domains 232 may include a local domain 232*loc* and one or more remote domains 232*a*, 232*b*, 232*n*. Each of the domains 232 may be associated with one or more peers (neighbors) 234 in that domain 232 (or that allow access to that domain 232).

One or more Ethernet segments may also be configured at network device 200 for multihoming groups in the EVPN DCI multihomed network that include the network device 200. This ES configuration may be stored in ES configuration data 222 and may include an ESI 244 for each ES 242 along with one or more associated addresses 246 (e.g., a MAC and IP address) that may be reached through that ES 242. The data for an ES 242 may also include one or more physical interfaces 248 (e.g., network interface 212) associated with that ES 242.

Accordingly, during operation in an EVPN DCI multihomed network, network device 200 may establish (or attempt to establish) BGP sessions with peers 234 in domains 232 as defined in domain peer configuration data 226. The status of BGP sessions with peers 234 can be tracked by BGP session tracker 230. In particular, BGP session tracker 230 may maintain BGP session data 224 that may include data on a BGP session associated with each of peers 234 (e.g., BGP neighbors) associated with domains 232. Thus, BGP session data 224 may include entries 262 for a set of BGP neighbors 264, where those BGP neighbors 264 may comprise peers 234 associated with domains 232 configured at network device 200. There may additionally be a status 266 associated with each entry 262 for a BGP session, where this status 266 specifies a state for that BGP session (e.g., a BGP session state or a state designation that may be associated with a BGP session state).

BGP session tracker 230 can update this status 266 based on the state of the corresponding BGP session with the neighbor 264. For example, when a hold timer for the BGP session with the neighbor 264 corresponding to that entry 262 expires (e.g., without receiving any updates from neighbor 264) the BGP session tracker 230 may determine that this BGP session has gone down and update the status 266 of the entry 262 for that BGP session to inactive (e.g., Idle).

When a status for a BGP session associated with a peer 234 of a domain 232 changes, BGP session tracker 230 can update BGP session status 236 associated with that peer 234 in domain peer configuration data 226 to reflect the status of the BGP session between network device 200 and that peer 234 (e.g., it may be updated to an inactive or Idle status). It will be noted here that the data described with respect to Ethernet segment configuration data 222, domain peer configuration data 226 and BGP session data 224 may be included in more, fewer or other types or combinations of tables or data structures than described herein without loss of generality; and it should likewise be understood that the description, depiction and groupings of this data are provided herein purely for purposes of ease of depiction and description in association with embodiments and in should in no way be taken as limiting to embodiments herein. The maintenance and use of other data structures and combinations of data (including data or structures maintained or configured at network device 200 with respect to EVPN DCI multihomed networks) to maintain and store the data as utilized by embodiments is fully contemplated herein.

Referring still to FIG. 2, when BGP session tracker 230 determines that a BGP session for a peer 234 for a domain 232 has gone down (e.g., and updates the BGP session status 236 for that peer 234 for the domain 232 in peer configuration data 2260), BGP session tracker 230 can then determine if there are any more active BGP session between network device 200 and the domain 232 including that peer 234 (for which the BGP session has gone down) (e.g., whether all BGP sessions for all peers 234 for that same domain 232 are now inactive). Specifically BGP session tracker 230 may determine the BGP session status 236 for all peers 234 for that same domain 232 to determine if there any remaining active BGP sessions for any of those peers 234 (e.g., is that domain 232 still reachable from network device 200).

When there are no more active BGP sessions between the network device 200 and any peer 234 of the domain 232, BGP session tracker 230 may determine that the link between the network device 200 and that domain 232 is down. In response to this determination, BGP session tracker 230 may withdraw network device 200 from any multihoming group(s) associated with that domain 232 to which the link was lost.

In particular, withdrawal module 238 of BGP session tracker 230 may, in response to a determination that the link to a domain 232 has been lost (e.g., all BGP sessions associated with all peers 234 of that domain 232 are inactive or Idle) determine all peers 234 associated with that domain 232. Withdrawal module 238 can then access ethernet segment configuration data 222 and (e.g., based on the peers 234 associated with the domain 232 to which the link has been lost) determine any ES 242 for any multihoming group associated with that domain 232. If there are any multihoming groups (e.g., using ES 242) associated with domain 232 to which the link was lost, the ESI 244 associated with those multihoming groups can be identified from ethernet segment configuration data 222. Withdrawal module 238 can then withdraw network device 200 from those identified multihoming groups associated with the domain 232 to which the link was lost using the ESI 244 associated with each of the identified multihoming groups. In one embodiment, withdrawal module 238 may issue a withdrawal for the advertised type 1 (e.g., AD) routes and the type 4 routes associated with that network device 200 for any multihoming groups associated with that network device 200 and the domain 232 to which the link was lost by broadcasting a withdrawal identifying the corresponding ESI 244 for that multihoming group to peers in (e.g., all) other domains (e.g., to all peers in all other domains or peers in other domains that may utilize or be associated with that multihoming group)

For example, if a link to a remote domain 232*a*, 232*b*, 232*n* Is determined to be down (e.g., all BGP sessions to peers 234 associated with that domain 232 are deemed inactive or Idle), the withdrawal module 238 may broadcast a message withdrawing from any multihoming group associated with that remote domain 232*a*, 232*b*, 232*n* to the set of peers 234 of the network device 200 in the local domain 232*loc* to which the network device 200 belongs. Conversely, if all links to network device's local domain 232*loc* are determined to be down (e.g., all BGP sessions to peers 234 associated with the local domain 232*loc* are deemed inactive or Idle) the withdrawal module 238 may broadcast a message withdrawing from any multihoming group associated with that local domain 232*loc* to the set of peers 234 of the network device 200 in each remote domain 232*a*, 232*b*, 232*n* (e.g., peers 234 of each remote domain associated with an identified multihoming group). Such a withdrawal may comprise, or initiate, a mass withdrawal.

Figure 3:
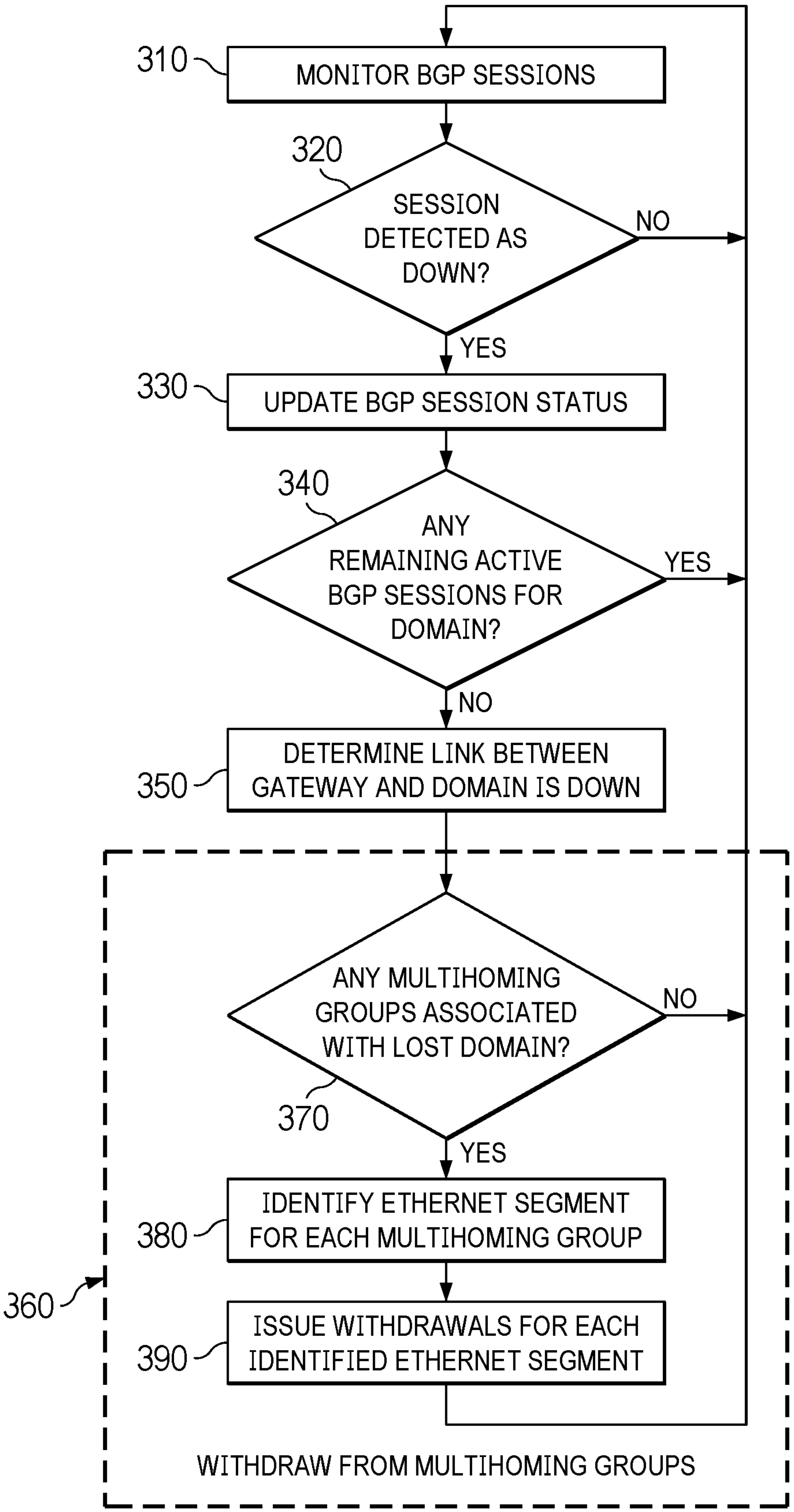
FIG. 3 is a flow diagram of one embodiment of a method for dealing with partial failures of links to domains at a gateway.

Moving on to FIG. 3, one embodiment of a method for dealing with partial failures to domains at a gateway in an EVPN DCI multihomed network is depicted. Such a method may be implemented, for example, by a network device. Here, during operation as a gateway for a local domain in an EVPN DCI multihomed network BGP sessions with peers in domains of the EVPN DCI multihomed network may be monitored (STEP 310). When it is detected that a BGP session with peer for a domain has gone down (e.g., a hold time associated with the BGP session has expired or a link status with the peer is down) (Y Branch of STEP 320), a status of the corresponding BGP session can be updated to reflect that the BGP session is inactive (e.g., update the status to an Idle status) (STEP 330). Additionally, when it is determined that a BGP session for a peer for a domain has gone down it can be determined if there are any more active BGP sessions between the gateway and other peers in that same domain (STEP 340). For example, the BGP session status for all peers for that domain may be evaluated to determine if any of the BGP sessions for those peers has a status other than Idle (e.g., or, conversely, it can be determined if all of the BGP sessions status for all peers of that domain are indicated as Idle).

When there are no more active BGP sessions between the getaway and any peer of the domain (N Branch of STEP 340), it can be determined that the link between the gateway and that domain is down (STEP 350). In response to this determination, the gateway can be withdrawn from any multihoming group(s) to which that gateway belongs (e.g., configured at the gateway) that are associated with the domain to which the link was lost (STEP 360). In one embodiment, it can be determined if there are any multihoming groups to which the gateway belongs that are associated with the domain to which the link was lost (STEP 370). If any such multihoming groups are identified (Y Branch of STEP 370), the ESI associated with those multihoming groups can be identified (STEP 380). One or more withdrawals specifying those ESIs can then be issued to peers in (e.g., all) other domains (e.g., to all peers in all other domains or peers in other domains that may utilize or be associated with that multihoming group) (STEP 390). This withdrawal may include withdrawing any advertised type 1 (e.g., AD) routes or type 4 routes. In this manner, if a link to a remote domain is determined to be down, a message withdrawing from any multihoming group associated with that remote domain may be issued to a set of peers of the gateway in that gateway's local domain. Alternatively, if a link to the gateway's local domain is determined to be down, a message withdrawing from any multihoming group associated with that local domain may be issued to the set of peers of the gateway in each remote domain associated with those multihoming groups.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method, comprising:

monitoring a BGP session associated with a link between a gateway and a first domain, wherein the gateway resides in a local domain of an Ethernet Virtual Private Network (EVPN) Data Center Interconnect (DCI) Network and the gateway is a member of a multihoming group at a second domain, wherein the multihoming group is associated with the first domain, and the local domain and the first domain are interconnected over a network through the gateway via the link using DCI over EVPN;

detecting the link between the gateway and the first domain is down based on the monitored BGP session; and withdrawing, by the gateway, from the multihoming group at the second domain.

2. The method of claim 1, wherein the first domain is the local domain including the multihomed gateway, and the second domain is a remote domain.

3. The method of claim 2, wherein the link comprises one or more links between the gateway and one or more spine nodes in the local domain.

4. The method of claim 1, wherein the second domain is the local domain and the first domain is a remote domain.

5. The method of claim 1, wherein detecting the link between the gateway and the first domain is down, comprises determining a Border Gateway Protocol (BGP) session between the gateway and a peer associated with the first domain is inactive.

6. The method of claim 5, further comprising determining that there are no active BGP sessions between the gateway and any peers associated with the first domain.

7. The method of claim 5, wherein determining the BGP session is inactive comprises tracking the BGP session.

8. The method of claim 5, wherein determining the BGP session is inactive is based on a link status associated with the BGP session.

9. The method of claim 1, wherein withdrawing from the multihoming group at the second domain comprises issuing a mass withdrawal from the gateway to one or more peers associated with the second domain.

10. A network device, comprising:

a processor;

a non-transitory computer readable medium, comprising instructions for:

configuring the network device as a gateway that is part of a multihoming group in a first domain of an Ethernet Virtual Private Network (EVPN) Data Center Interconnect (DCI) Network, the multihoming group associated with a second domain of the EVPN DCI network;

monitoring a first BGP session associated with a first peer of the gateway associated with the first domain of the EVPN DCI network;

monitoring a second BGP session associated with a second peer of the gateway associated with the second domain of the EVPN DCI network; and in response to detecting that a first link between the gateway and the first domain is down wherein the first domain and the second domain are interconnected over a network through the gateway via the first link using DCI over EVPN and the first link is detected as down based on the first BGP session or second BGP session, issuing a withdrawal associated with the multihoming group to the second peer.

11. The network device of claim 10, wherein the instructions are further for:

in response to detecting that a second link between the gateway and the second domain is down, issuing the withdrawal associated with the multihoming group to the first peer.

12. The network device of claim 11, wherein monitoring the first BGP session comprises tracking the first BGP session associated with first peer, and monitoring the second BGP session comprises tracking the second BGP session associated with the second peer.

13. The network device of claim 11, wherein monitoring the first BGP session comprises monitoring a first link status associated with the first peer associated with the first domain, and monitoring the second BGP session comprises monitoring a second link status associated with the second peer associated with the second domain.

14. The network device of claim 11, wherein detecting the first link between the gateway and the first domain is down comprises determining that there are no active BGP sessions between the gateway and any other peers associated with the first domain, and detecting the second link between the gateway and the second domain is down comprises determining that there are no active BGP sessions between the gateway and any other peers associated with the second domain.

15. The network device of claim 10, wherein issuing a withdrawal associated with the multihoming group comprises determining the multihoming group based on the first peer or the second peer and the multihoming group is identified based on an Ethernet Segment Identifier (ESI).

16. The network device of claim 15, wherein the withdrawal is a mass withdrawal specifying the ESI.

17. A non-transitory computer readable medium, comprising instructions for:

tracking a BGP session between a gateway in a first domain of a Ethernet Virtual Private Network (EVPN) Data Center Interconnect (DCI) Network and a peer in a second domain of the EVPN DCI network, the BGP session associated with a DCI over EVPN link between the first domain and the second domain;

based on the tracking of the BGP session, detecting the BGP session between the gateway and the peer in the second domain is down;

determining that there are no active BGP sessions between the gateway and any other peers associated with the second domain; and withdrawing, by the gateway, from a multihoming group associated with the second domain by issuing a withdrawal to the first domain.

18. The non-transitory computer readable medium of claim 17, wherein the withdrawal identifies an Ethernet Segment Identifier associated with the multihoming group.

19. The non-transitory computer readable medium of claim 18, wherein the withdrawal is a mass withdrawal.

20. The non-transitory computer readable medium of claim 18, wherein detecting the BGP session is down comprises determining if a hold timer for the BGP session has expired.

* * * * *